(12) United States Patent
Csordas et al.

(10) Patent No.: US 12,434,515 B2
(45) Date of Patent: Oct. 7, 2025

(54) METHOD AND APPARATUS FOR DETERMINING THE CONDITION OF A VEHICLE TIRE

(71) Applicant: Bayerische Motoren Werke Aktiengesellschaft, Munich (DE)

(72) Inventors: Armand Csordas, Rosenheim (DE); Andrea Ficht, Roehrmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 344 days.

(21) Appl. No.: 17/801,885

(22) PCT Filed: Feb. 12, 2021

(86) PCT No.: PCT/EP2021/053432
§ 371 (c)(1),
(2) Date: Aug. 24, 2022

(87) PCT Pub. No.: WO2021/170422
PCT Pub. Date: Sep. 2, 2021

(65) Prior Publication Data
US 2023/0081221 A1   Mar. 16, 2023

(30) Foreign Application Priority Data

Feb. 25, 2020   (DE) ............... 10 2020 104 928.5

(51) Int. Cl.
*B60C 23/04*   (2006.01)
(52) U.S. Cl.
CPC ............... *B60C 23/0476* (2013.01)

(58) Field of Classification Search
CPC ............... B60C 23/0474; B60C 23/0476
See application file for complete search history.

(56) References Cited

U.S. PATENT DOCUMENTS

| 4,186,377 A | 1/1980 | Barabino |
| 4,938,056 A | 7/1990 | DeRudder et al. |
| (Continued) | | |

FOREIGN PATENT DOCUMENTS

| DE | 697 09 417 T2 | 8/2002 |
| DE | 101 44 328 A1 | 4/2003 |
| (Continued) | | |

OTHER PUBLICATIONS

International Search Report (PCT/ISA/210) issued in PCT Application No. PCT/EP2021/053432 dated Apr. 1, 2021 with English translation (five (5) pages).

(Continued)

*Primary Examiner* — Yoshihisa Ishizuka
(74) *Attorney, Agent, or Firm* — Crowell & Moring LLP

(57) ABSTRACT

An apparatus includes a device that is configured to determine a condition of a first tire of a vehicle. At a current point in time the device is also configured to determine, on a basis of pressure measured values with respect to a tire pressure of the first tire at the current point in time and at a preceding point in time, a rate of change of the tire pressure of the first tire. At a current point in time the device is also configured to compare the determined rate of change to a reference rate. At a current point in time the device is also configured to determine the condition of the first tire on the basis of the comparison.

9 Claims, 1 Drawing Sheet

(56) References Cited

U.S. PATENT DOCUMENTS

| | | | |
|---|---|---|---|
| 5,895,846 | A | 4/1999 | Chamussy et al. |
| 2003/0070477 | A1 | 4/2003 | Fischer et al. |
| 2005/0057347 | A1 | 3/2005 | Baader et al. |
| 2005/0139000 | A1* | 6/2005 | Walenty .............. B60C 23/0408 73/146.5 |
| 2005/0241380 | A1 | 11/2005 | Welch et al. |
| 2005/0242936 | A1 | 11/2005 | Watabe |
| 2006/0122747 | A1 | 6/2006 | Brown |
| 2007/0194896 | A1 | 8/2007 | Ehrlich et al. |
| 2019/0023089 | A1 | 1/2019 | Abdossalami et al. |

FOREIGN PATENT DOCUMENTS

| | | |
|---|---|---|
| DE | 10 2018 117 679 A1 | 1/2019 |
| EP | 1 813 447 A2 | 8/2007 |
| EP | 2 535 211 A1 | 12/2012 |
| GB | 2536497 A | 9/2016 |
| WO | WO 03/033284 A1 | 4/2003 |

OTHER PUBLICATIONS

German-language Written Opinion (PCT/ISA/237) issued in PCT Application No. PCT/EP2021/053432 dated Apr. 1, 2021 (three (3) pages).

German-language Search Report issued in German Application No. 10 2020 104 928.5 dated Oct. 21, 2020 with partial English translation (15 pages).

\* cited by examiner

METHOD AND APPARATUS FOR DETERMINING THE CONDITION OF A VEHICLE TIRE

BACKGROUND

The disclosure relates to a method and a corresponding apparatus for determining the condition of a tire, in particular for recognizing a gradual, slow, and/or elevated pressure loss of a tire.

A vehicle can comprise pressure sensors, which are configured to detect pressure measured values with respect to the pressure in the different tires of the vehicle. It can be recognized, for example, on the basis of the pressure measured values that a tire of the vehicle does not have sufficient pressure, and therefore should be inflated. The driver of the vehicle can be informed about the pressure in the individual tires of the vehicle. Furthermore, the driver can be prompted to inflate a tire if it is recognized that the tire does not have sufficiently high tire pressure and/or that the tire pressure of the tire is below a specific pressure threshold value. The excessively low tire pressure can be caused here by a defect and/or by an impairment of the tire.

An excessively low tire pressure can have the result that the vehicle has an elevated energy consumption, in particular fuel consumption. In addition, the driving behavior of the vehicle can be negatively affected by a tire having an excessively low tire pressure. Furthermore, an excessively low filling pressure can result in shortening of the tire service life in the long term.

SUMMARY

The present document relates to the technical problem of already recognizing an impaired tire early, in particular before the tire pressure in the impaired tire falls below a specific pressure threshold value (in the case of which the output of a notification to the driver of the vehicle is typically effectuated to prompt the driver to inflate the tire).

The object is achieved by each of the independent claims. Advantageous embodiments are described, inter alia, in the dependent claims. It is to be noted that additional features of a claim dependent on an independent claim, without the features of the independent claim or only in combination with a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, a device for determining the condition of a first tire of a (motor) vehicle is described. The vehicle can have N (for example, N=2 or N=4) tires. The device can be part of the vehicle.

The device can be configured to determine a rate of change (for example, a temporal gradient) of the tire pressure of the first tire at a current point in time, on the basis of pressure measured values with respect to the tire pressure of the first tire at the current point in time and at a preceding point in time. In particular, it can be determined on the basis of the two pressure measured values (which can be detected by a pressure sensor of the first tire) how strongly and/or how quickly the tire pressure has dropped between the two points in time. The two points in time can be spaced apart from one another by a specific time interval (for example, between 1 and 10 minutes).

Furthermore, the device is configured to compare the determined rate of change to a reference rate. The reference rate can indicate a rate of change of the tire pressure which is expected for a flawless tire. The reference rate can be determined on the basis of the rates of change of the tire pressure of one or more other tires of the vehicle and/or on the basis of preceding rates of change of the tire pressure of the first tire (for example as a mean value).

The device is furthermore configured to determine the condition of the first tire on the basis of the comparison. In particular, the device can be configured to check whether the determined rate of change of the tire pressure of the first tire is significantly higher, for example, by more than a specific factor and/or percentage, than the reference rate or not. It can then be determined that the first tire is impaired if it is established that the determined rate of change of the tire pressure of the first tire is significantly higher than the reference rate. Alternatively, it can be determined that the first tire is not impaired if it is established that the determined rate of change of the tire pressure of the first tire is not significantly higher than the reference rate.

The device thus enables a reliable and efficient and early recognition as to whether a tire of a vehicle is impaired or not. In particular, it can already be recognized on the basis of the rate of change whether a tire is impaired (even before the absolute tire pressure has fallen below a specific pressure threshold value). A notification can then be output to a user of the vehicle if it is recognized that the tire is impaired. It is thus possible to reliably prevent the vehicle from driving with a tire which has an excessively low tire pressure (below the pressure threshold value).

The device can be configured to determine, on the basis of pressure measured values with respect to the tire pressure of a second tire of the vehicle at at least two different points in time, in particular at the current point in time and at the preceding point in time, a rate of change of the tire pressure of the second tire. The rate of change of multiple other tires, in particular all other tires, of the vehicle can be determined in a corresponding manner. The reference rate can then be determined on the basis of the rate of change of the tire pressure of the second tire and/or on the basis of the rate of change of the tire pressure of the other tires of the vehicle (for example as a mean value). The condition of the first tire can thus be determined in a particularly reliable and efficient manner.

Alternatively or additionally, the device can be configured to determine a characteristic diffusion rate for the first tire, in particular for the tire type of the first tire. For example, the rate of change of the tire pressure of the first tire can be determined at each of a large number of preceding points in time. In other words, a history of the rates of change of the tire pressure of the first tire can be determined and stored. The characteristic diffusion rate for the first tire can then be determined on the basis of the rates of change at the plurality of preceding points in time.

The reference rate for the comparison can be determined on the basis of the characteristic diffusion rate for the first tire. The condition of the first tire can thus be determined in a particularly reliable and efficient manner.

The device can be configured to compare the determined rate of change for the current point in time to a first reference rate, which is dependent on the rate of change of the tire pressure of the second tire. Furthermore, the device can be configured to compare the determined rate of change for the current point in time to a second reference rate, which is dependent on the characteristic diffusion rate for the first tire. Two different comparisons can thus be carried out. The condition of the first tire can then be determined in a particularly precise manner on the basis of the comparison to the first reference rate and on the basis of the comparison to the second reference rate. In particular, the use of multiple comparisons enables a mutual plausibility check here.

The device can be configured to determine a rate of change of the tire pressure of the first tire at each of a plurality of successive points in time and to compare the determined rate of change in each case to the reference rate. The condition of the first tire can then be determined in a particularly precise manner on the basis of the plurality of comparisons for the plurality of successive points in time. It can then possibly be determined (for example only then) that the first tire is impaired if the determined rate of change at a specific minimum number of successive points in time is (significantly) above the reference rate.

As already described above, the device can be configured to determine a rate of change of the tire pressure of the first tire at each of a plurality of successive points in time and to compare the determined rate of change in each case to the reference rate. On the basis of the plurality of comparisons for the plurality of successive points in time, a remaining running time of the first tire can then be predicted. For example, the point in time can be predicted at which the rate of change of the tire pressure of the first tire will be significantly above the reference rate. The forecasted or predicted remaining running time can then be output as a notification to a user of the vehicle (so that the user can effectuate a repair and/or a replacement of the first tire early). The comfort can thus be further increased for a user.

The device can be configured to determine temperature measured values with respect to the temperature of the first tire at the current point in time and at the preceding point in time. The rate of change of the tire pressure of the first tire can then also be determined on the basis of the temperature measured values, in particular in such a way that the rate of change relates to a defined reference temperature. The accuracy of the determination of the condition of the first tire can be increased by the consideration of the temperature measured values.

According to a further aspect, a (road) motor vehicle (in particular a passenger vehicle or a truck or a bus or a motorcycle) is described, which comprises the device described in this document.

According to a further aspect, a method for determining a condition of a first tire of a vehicle is described. The method comprises, for a current point in time, determining, on the basis of pressure measured values with respect to the tire pressure of the first tire at the current point in time and at a preceding point in time, a rate of change of the tire pressure of the first tire. Furthermore, the method comprises comparing the determined rate of change to a reference rate. The method furthermore comprises determining the condition of the first tire on the basis of the comparison.

According to a further aspect, a software (SW) program is described. The SW program can be configured to be executed on a processor (for example on a control unit of a vehicle), and to thus carry out the method described in this document.

According to a further aspect, a storage medium is described. The storage medium can comprise an SW program, which is configured to be executed on a processor, and to thus carry out the method described in this document.

It is to be noted that the methods, devices, and systems described in this document can be used both alone and also in combination with other methods, devices, and systems described in this document. Furthermore, any aspects of the methods, devices, and systems described in this document can be combined with one another in diverse ways. In particular, the features of the claims can be combined with one another in diverse ways.

The invention is described in more detail hereinafter on the basis of exemplary embodiments. In the figures

DETAILED DESCRIPTION OF THE DRAWINGS

Figure 1:
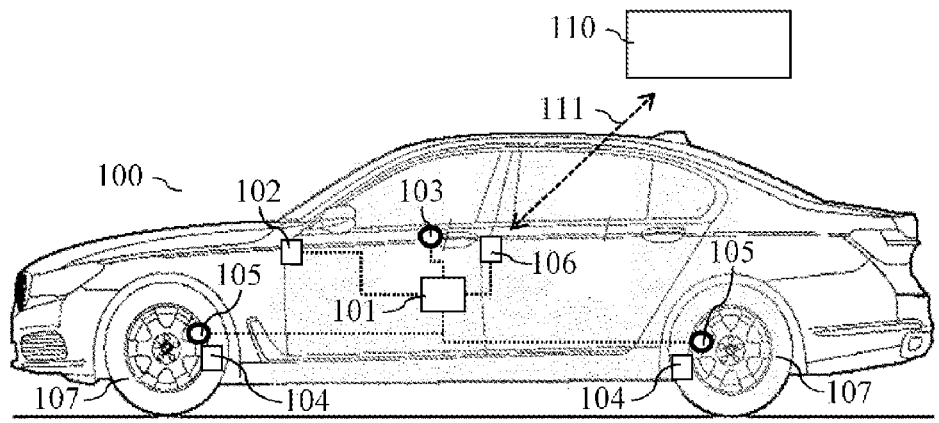
FIG. 1 shows exemplary components of a vehicle.

As described at the outset, the present document relates to the reliable and early recognition of an impaired tire (even before the tire has an excessively low tire pressure). In this context, FIG. 1 shows an exemplary vehicle 100 having multiple tires 107. The tires 107 each have a pressure sensor 105, which is configured to detect sensor data (in particular pressure measured values) with respect to the tire pressure of the respective tire 107. The pressure measured values of the individual pressure sensors 105 can be evaluated by an evaluation device 101 of the vehicle 100, in particular to recognize whether the tire pressure in the individual tires 107 is above a specific pressure threshold value.

The vehicle 100 can furthermore comprise at least one temperature sensor 104, which is configured to detect sensor data (in particular temperature measured values) with respect to the temperature of the gas (in particular the air) within the one or more tires 107. In addition, the vehicle 100 can comprise an outside temperature sensor 102, which is configured to detect sensor data with respect to the outside temperature of the vehicle 100. The vehicle 100 can furthermore comprise an outside pressure sensor 103, which is configured to detect sensor data with respect to the atmospheric pressure. In addition, the vehicle 100 can comprise a communication unit 106, which is configured to exchange data via a (wireless) communication interface 111 with a vehicle-external unit 110 (for example, with a backend server).

The evaluation device 101 can be configured to determine a rate of change of the tire pressure of the tire 107 on the basis of chronologically successive pressure measured values of the pressure sensor 105 of a tire 107. The rate of change can be calculated here as the difference of the pressure measured values in relation to the time interval of the measurement points in time for the two pressure measured values. The time interval can be, for example, 10 minutes or less, or 5 minutes or less.

For all tires 107 of the vehicle 100 (for example, for two tires or for four tires) rates of change of the tire pressure in each of the different tires 107 can be determined at a specific point in time. The rates of change in the different tires 107 can be compared to one another, in particular to detect a tire 107 which has a rate of change which is overelevated in comparison to the rates of change of the one or more other tires 107 (which is, for example, more than 20% above the rates of change of the one or more other tires 107).

The rates of change of the individual tires 107 can be determined at a sequence of successive points in time and compared to one another. If a tire 107 repeatedly has a comparatively high rate of change, this tire 107 can thus be considered to be impaired. In particular, it can be recognized that this tire 107 has an elevated tire diffusion and is therefore possibly defective. The user of the vehicle 100 can be notified of the identified tire 107 via a user interface of the vehicle 100, in particular to prompt the user to have the tire 107 serviced early or replaced (even before the tire pressure in the tire 107 falls below the pressure threshold value).

The rates of change can be determined for a specific reference temperature (for example 25° C.). For this purpose, the tire pressure at the reference temperature can be determined on the basis of the pressure measured value for a tire 107 and on the basis of a temperature measured value of the temperature of the tire 107. In particular, the measured tire pressure at the measured tire temperature can be converted by means of a thermal condition formula (for example for an ideal gas) into a calculated tire pressure at the reference temperature. The rates of change can then be determined on the basis of the calculated tire pressures for the reference temperature. Temperature differences between the tires 107 can thus be equalized in a precise manner.

Figure 2:
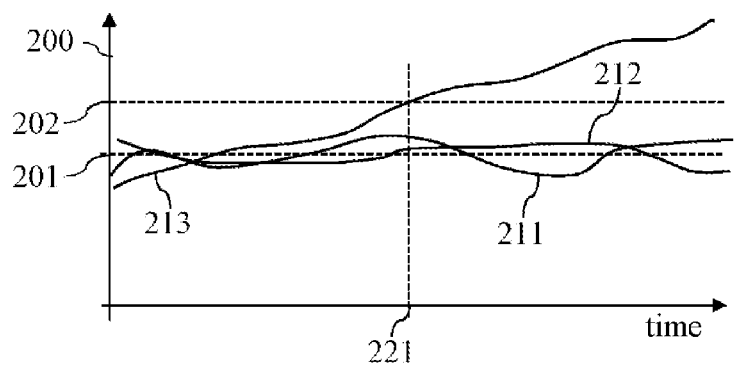
FIG. 2 shows exemplary time curves of the rates of change of the tire pressure.

FIG. 2 shows exemplary time sequences 211, 212, 213 of the (absolute values of the) rates of change 200 of the tire pressure in different tires 107. In the example shown in FIG. 2, the rates of change 200 in the sequences 211, 212 are approximately equal. On the other hand, the rate of change 200 increases in the sequence 213 with time, and deviates sufficiently strongly from the rates of change 200 of the sequences 211, 212 from the point in time 221 that it can be concluded that the tire 107 is impaired with the sequence 213 of rates of change 200.

Alternatively or additionally, the evaluation device 100 can be configured to determine a reference rate of change 201 or a characteristic tire diffusion 201 for tires 107 of a specific tire type and/or for a specific tire 107. In particular, the tire type of the tires 107 of the vehicle 100 can be determined. The reference rate of change 201 for this tire type can then be determined, in particular queried from the vehicle-external unit 110.

The measured rate of change 200 for a tire 107 can be compared to the reference rate of change 201 of the tire type of the tire 107. If it is recognized that the measured rate of change 200 deviates in a specific amount from the reference rate of change 201 (for example, by more than a specific percentage, represented by the straight line 202), it can thus be concluded that the tire 107 is impaired.

A mutual plausibility check is enabled by a comparison of the measured rates of change 200 for the tires 107 of a vehicle 100 to one another (method 1) and by the comparison of the measured rate of change 200 for a tire 107 to the reference rate of change 201 (method 2). In particular, it can be checked whether a tire 107 is detected as impaired or not both on the basis of method 1 and also on the basis of method 2. A notification can possibly only be output to the user of the vehicle 100 in the first case. The quality of the recognition of an impaired tire 107 can thus be increased.

A method and a device for detecting a gradual, relatively slow pressure loss of a tire 107 of a vehicle 100 are thus described. The pressure loss can be traced back, for example, to a valve defect and/or to driving damage. The method can combine two different methods (method 1 and method 2) to recognize an elevated pressure loss, wherein carrying out the respective method can be situation-dependent. (Simultaneously) carrying out both methods enables a mutual plausibility check. In the described methods, pressure threshold values (possibly individual by wheel) are not used to recognize an abnormally high pressure loss.

As described in conjunction with FIG. 1, the vehicle 100 can be equipped with tire pressure monitoring sensors 105. Furthermore, the vehicle 100 can be connected, for example, via mobile radio, to a cloud or to a vehicle-external unit 110. In the methods described in this document, measured variables for the tire filling pressures of the different tires 107, the tire temperatures of the different tires 107, the outside temperature, and/or the atmospheric pressure can be taken into consideration.

A directly measuring tire pressure monitoring (each tire 107 has a pressure sensor 105 for monitoring the tire pressure of the respective tire 107) can take place. Furthermore, a regular update of the measured tire pressures can take place in the vehicle 100 (for example, every 5 minutes or more often). Furthermore, a regular update of the outside temperature and/or the atmospheric pressure can take place. In addition, it can be determined which tire type of tires 107 is mounted on the vehicle 100 (this can be determined, for example, on the basis of a QR code, on the basis of RFID, etc.).

In the scope of the method 1, a calculation of the temperature-compensated tire pressure rate 200 can be carried out with respect to an initial condition Pinit at the point in time tinit for all (four) tires 107 on the vehicle. The tire pressure rate 200 (i.e., the rate of change) can then be determined as Tire pressure rate=$(Pinit-Pi)/(tinit-ti)$ wherein Pi is the (temperature-compensated) pressure measured value at the point in time ti.

The pressure rates 200 of the tires 107 installed on the vehicle 100 can be compared to one another in a defined time window (for example, a time window of 5 minutes). The tire 107 having the greatest pressure rate 200 (in absolute value) can be identified. If this pressure rate 200 is greater by a specific (parameterizable) factor than the mean value of the (possibly three) other tires 107, it can thus possibly be confirmed that the identified tire 107 has an elevated pressure loss. If this confirmation takes place in a specific number of pressure measurements in succession, it can thus be concluded (and possibly a corresponding notification can be output) that an abnormally high pressure loss is present on the tire 107 having the greatest pressure rate 200.

On the basis of the unique assignment of the tires and tire data to one another, a history of the pressure rates 200 of individual tires 107 (in particular for each individual tire 107 of the vehicle 100) can be stored (for example in a vehicle-external unit 110). The temperature-compensated pressure of a tire 107 can thus be tracked and analyzed over a longer time period. It is thus possible to derive the characteristic natural tire diffusion 201 of a tire 107 (for example as a mean value of the pressure rates 200 from the history). If multiple vehicles 100 are equipped with the same tires 107, a characteristic tire diffusion 201 can be statistically derived for this tire type. Abnormal deviations which go beyond the natural tire diffusion 201 can thus be recognized (method 2).

The calculation of the abovementioned pressure rates 200 can take place in the backend in a cloud (i.e., in a vehicle-external unit 110) and/or directly on the evaluation device 101 of the vehicle 100. Furthermore, an allocation, according to which a part is calculated on the evaluation device 101 of the vehicle 100 and the other part in the vehicle-external unit 110, is conceivable.

Each individual tire 107 of a vehicle 100 can be uniquely identifiable in the vehicle-external unit 110 and a history having pressure measured values and/or pressure rates 200 can be applied for each individual tire 107.

The detection of an abnormal pressure loss can be checked for plausibility and established with elevated reliability by the combination of methods 1 and 2. For the case in which sufficient history for a tire 107 or tire type is not yet available (and thus an establishment of an abnormal tire pressure rate on the basis of the comparison of the measured tire pressure rate to the characteristic tire diffusion 201 is not possible), an abnormal pressure loss can be recognized by method 1.

With the aid of the characteristic natural diffusion 201, it can be identified whether a pressure rate 200 determined for a tire 107 is a natural diffusion 201 or a (relatively slow) pressure loss. If more than one tire 107 of a vehicle 100 has an abnormal pressure loss, this can be recognized via the comparison of the respective tire pressure rate 200 to the rate 201 of the natural diffusion. An event can be output on this basis and the model logic from method 1, which gives information about the one or more damaged tires 107.

A future prognosis of the remaining running time of a tire 107 can be derived via the history of the pressure curve and/or the curve 211, 212, 213 of the pressure rates 200 of one or more damaged tires 107 (for example in the vehicle-external unit 110) in consideration of the previous driving profile. This prognosis can comprise an extrapolation of a sequence 211, 212, 213 of pressure rates 200 into the future as a function of the time, based on the historic curve 211, 212, 213 of the pressure rates 200 of the tire 107 (under the condition of a uniform driving profile). The prognosis with respect to the remaining running time can be transmitted as a notification to the user of the vehicle 100 and/or to a breakdown server as a basis for a recommendation for further travel.

Figure 3:
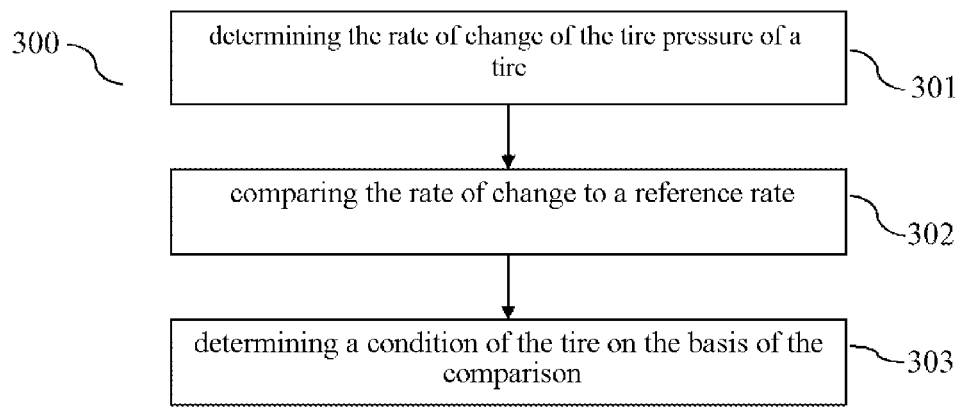
FIG. 3 shows a flow chart of an exemplary method for determining the condition of a vehicle tire.

FIG. 3 shows a flow chart of a (possibly computer-implemented) method 300 for determining a condition of a first tire 107 of a vehicle 100. The vehicle 100 can have, for example, N (N=2 or N=4) different tires 107 (possibly on different wheels).

The method 300 comprises, for a current point in time, determining 301, on the basis of pressure measured values with respect to the tire pressure of the first tire 107 at the current point in time and at a preceding point in time, a rate of change 200 of the tire pressure of the first tire 107. In particular, it can be determined as the rate of change 200 how strongly and/or with which gradient the tire pressure of the first tire 107 has changed between the preceding point in time and the current point in time. The rate of change 200 can be related here to a specific reference temperature. In particular, the pressure measured values can be converted in consideration of temperature measured values with respect to the temperature of the first tire 107 at the current point in time and at the preceding point in time (by using a thermal condition equation of the gas (in particular air) in the first tire 107) to a common reference temperature.

Furthermore, the method 300 comprises comparing 302 the determined rate of change 200 to a reference rate. The reference rate can be determined on the basis of the calculated rate of change 200 of one or more other tires 107 of the vehicle 100 and/or on the basis of a characteristic diffusion rate 201 of the first tire 107.

The method 300 furthermore comprises determining 303 the condition of the first tire 107 on the basis of the comparison. In particular, it can be determined on the basis of the comparison whether the tire 107 is (possibly) impaired or not. A notification can possibly be output to a user of the vehicle 100 if it is recognized on the basis of the comparison that the tire 107 is impaired.

The measures described in this document enable, even without pressure threshold value, an abnormally high pressure loss to be recognized and possibly a notification in this regard to be output. By creating a history of the pressure rates 200 of a tire 107, a characteristic tire diffusion 201 can be determined and taken into consideration without this being known beforehand. The use of different methods enables a mutual plausibility check and thus an elevated level of certainty in the recognition of an abnormal pressure loss.

The present invention is not restricted to the exemplary embodiments shown. In particular, it is to be noted that the description and the figures are only to illustrate the principle of the proposed methods, devices, and systems by way of example.

The invention claimed is:

1. An apparatus comprising:
 a controller installed in a vehicle and that is operatively coupled to a pressure sensor, the controller also being configured to determine a condition of a first tire of a vehicle wherein, the controller also being configured, at a current point in time, to:
  determine, on a basis of pressure measured values measured with the pressure sensor with respect to a tire pressure of the first tire at the current point in time and at a preceding point in time, a rate of change of the tire pressure of the first tire;
  determine a reference rate based on a characteristic diffusion rate of a classified tire type, wherein the classified tire type comprises tires having similar diffusion characteristics determined from historical pressure change data;
  compare the determined rate of change of the first tire to a-the reference rate;
  determine the condition of the first tire on the basis of the comparison; and
  generate an output, indicative of a condition of the first tire that is transmittable to at least one of: a vehicle user interface, a remote server, or a maintenance system, wherein the output is configured to initiate: i) a tire servicing action, ii) a replacement recommendation, or iii) a remaining tire life prediction.

2. The apparatus according to claim 1, wherein the controller is also configured to:
 determine, on the basis of pressure measured values with respect to the tire pressure of a second tire of the vehicle at the current point in time and at the preceding point in time, a rate of change of the tire pressure of the second tire; and
 determine the reference rate on the basis of the rate of change of the tire pressure of the second tire.

3. The apparatus according to claim 1, wherein the controller is configured to:
 determine the rate of change of the tire pressure of the first tire at each of a large number of preceding points in time; and
 determine the characteristic diffusion rate for the first tire on the basis of the rates of change at the large number of preceding points in time.

4. The apparatus according to claim 3, wherein the controller is also configured to:
 compare the determined rate of change for the current point in time to a first reference rate that is different from the reference rate, the first reference rate being dependent on the rate of change of the tire pressure of the second tire;

compare the determined rate of change for the current point in time to a second reference rate, which is dependent on the characteristic diffusion rate for the first tire; and determine the condition of the first tire on the basis of the comparison to the first reference rate and on the basis of the comparison to the second reference rate.

5. The apparatus according to claim 4, wherein the controller is also configured to:

determine a rate of change of the tire pressure of the first tire at each of a plurality of successive points in time and to compare the determined rate of change in each case to the reference rate; and determine the condition of the first tire on the basis of the plurality of comparisons for the plurality of successive points in time.

6. The apparatus according to claim 5, wherein the controller is also configured to:

determine a rate of change of the tire pressure of the first tire at each of a plurality of successive points in time and to compare the determined rate of change in each case to the reference rate; and predict a remaining running time of the first tire on the basis of the plurality of comparisons for the plurality of successive points in time.

7. The apparatus according to claim 6, wherein the controller is also configured to:

determine temperature measured values with respect to a temperature of the first tire at the current point in time and at the preceding point in time; and also determine the rate of change of the tire pressure of the first tire on the basis of the temperature measured values, in such a way that the rate of change relates to a defined reference temperature.

8. The apparatus according to claim 7, wherein the controller is also configured to:

check whether the determined rate of change of the tire pressure of the first tire is higher than the reference rate, by more than a specific factor; and determine that the first tire is impaired if it is established that the determined rate of change of the tire pressure of the first tire is higher than the reference rate; and determine that the first tire is not impaired if it is established that the determined rate of change of the tire pressure of the first tire is not higher than the reference rate.

9. A method for determining a condition of a first tire of a vehicle; the method comprises, for a current point in time:

determining, using a controller, on the basis of pressure measured values measured by a pressure sensor with respect to the tire pressure of the first tire at the current point in time and at a preceding point in time, a rate of change of the tire pressure of the first tire;

determining a reference rate based on a characteristic diffusion rate of a classified tire type, wherein the classified tire type comprises tires having similar diffusion characteristics determined from historical pressure change data;

comparing the determined rate of change of the first tire to the reference rate;

determining the condition of the first tire on the basis of the comparison; and generating an output, indicative of a condition of the first tire, that is transmittable to at least one of: a vehicle user interface, a remote server, or a maintenance system, wherein the output is configured to initiate: i) a tire servicing action, ii) a replacement recommendation, or iii) a remaining tire life prediction.

* * * * *